United States Patent [19]

Sakurada

[11] Patent Number: 5,192,858
[45] Date of Patent: Mar. 9, 1993

[54] OPTICAL CARD SCANNING APPARATUS

[75] Inventor: Takefumi Sakurada, Akishima, Japan

[73] Assignee: Olympus Optical Co., Ltd., Tokyo, Japan

[21] Appl. No.: 687,445

[22] Filed: Apr. 18, 1991

[51] Int. Cl.$^5$ ............................................. G06K 13/00
[52] U.S. Cl. ................................................... 235/475
[58] Field of Search ............... 235/449, 454, 475, 476, 235/483, 484, 477, 478, 479; 360/2

[56] References Cited

U.S. PATENT DOCUMENTS

| | | | |
|---|---|---|---|
| 4,800,258 | 1/1989 | Suzuki et al. | 235/475 |
| 4,803,349 | 2/1989 | Sugimoto et al. | 235/475 |
| 4,907,098 | 3/1990 | Ohkoda et al. | 235/475 |
| 4,947,029 | 8/1990 | Kurihara et al. | 235/475 |
| 4,952,786 | 8/1990 | Inoue | 235/476 |
| 5,045,674 | 9/1991 | Mita et al. | 235/475 |
| 5,101,098 | 3/1992 | Naito | 235/475 |

FOREIGN PATENT DOCUMENTS

| | | |
|---|---|---|
| 61-42313 | 9/1986 | Japan . |
| 62-5731 | 2/1987 | Japan . |
| 62-92267 | 4/1987 | Japan . |
| 1-76179 | 3/1989 | Japan ................................. 235/475 |

Primary Examiner—Eugene R. LaRoche
Assistant Examiner—Tan Nguyen
Attorney, Agent, or Firm—Frishauf, Holtz, Goodman & Woodward

[57] ABSTRACT

An optical card scanning apparatus includes a mechanism for forwardly conveying an optical card inserted into a housing through an insertion port toward a carrier, while a shutter is open. First and second detectors for detecting the card passing therethrough are provided between the insertion port and shutter, and between the shutter and the carrier. The time difference between the detecting signals from the first and second detectors are compared with a standard time, and when the compared values are different, the inserted card is backwardly conveyed and outwardly ejected from the housing through the insertion port by the conveying mechanism.

8 Claims, 11 Drawing Sheets (PRIOR ART)

OPTICAL CARD SCANNING APPARATUS

BACKGROUND OF THE INVENTION

1. Field of the Invention

The present invention relates generally to an optical card apparatus for recording and/or reproducing information by use of an optical card, and more particularly to an optical card apparatus capable of automatically receiving an inserted optical card, loading the card on a mount table in its normal position, determining whether or not the inserted card is a normal one, and monitoring operations from the insertion of the card to the loading thereof, thereby detecting any abnormalities or defects in the operations.

An optical card has a memory capacity which is about 3,000 times to 10,000 times greater than that of a magnetic card. Although it is not possible to rewrite data on the optical card, it has a large memory capacity, e.g. 1 to 2 M bytes, and therefore is widely applicable to bankbooks, portable maps, prepaid cards, etc.

The optical card has a number of parallel linear information tracks on a predetermined area on its surface. In an information recording/reproducing apparatus using the optical card as a recording medium, a light beam spot is moved over the surface of the optical card in the direction of an information track, relative to the optical card, thereby effecting information recording/reproduction on the tracks. After the beam spot has moved on the track by a predetermined distance, the beam spot is moved to cross the track, thereby shifting the beam spot to another target track.

Published Unexamined Japanese Patent Application (PUJPA) No. 62-92267 discloses an example of the optical card apparatus performing the above-stated operation. In this apparatus, an optical card is mounted on a mount table. The mount table is movable reciprocally in the direction of information tracks, and a head unit for forming a light beam spot on an information track on the card is movable in a direction crossing the track.

Figure 1:
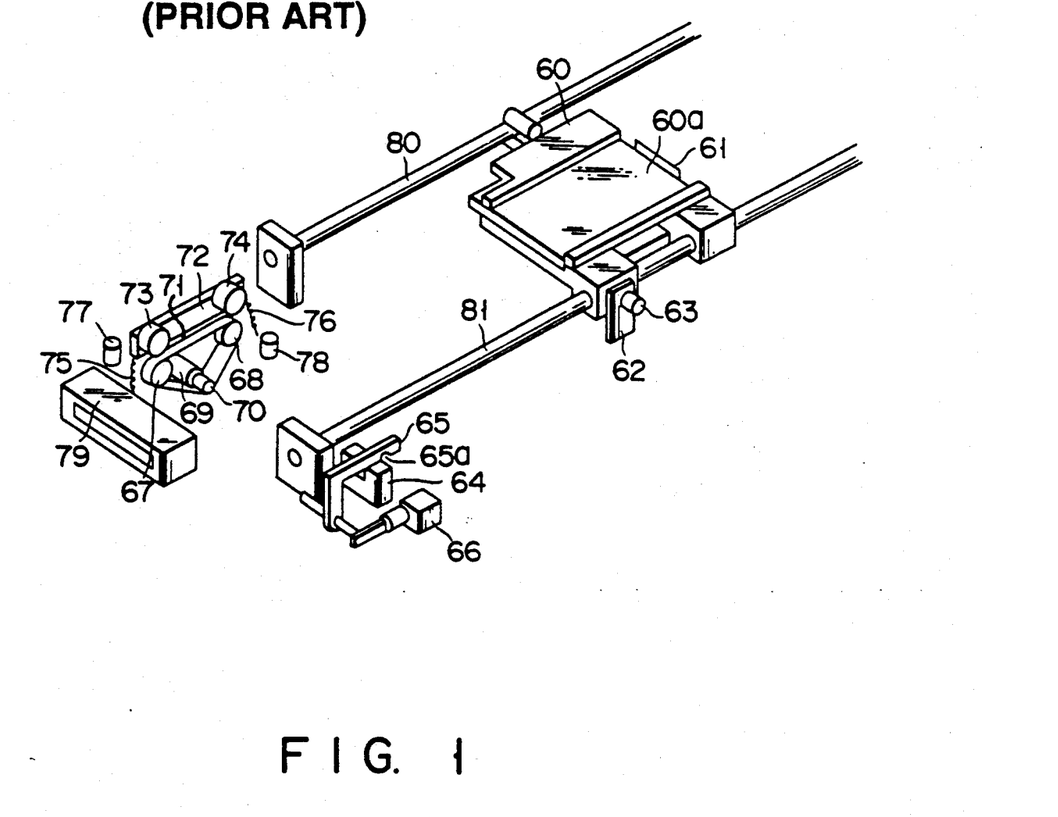
FIG. 1 is a perspective view showing a conventional optical card scanning apparatus.

FIG. 1 is a schematic view showing a conventional apparatus. In a card-receiving mechanism of this apparatus, a mount table 60 having on its surface a mounting portion 60a for mounting an optical card is movable reciprocally along a pair of guide members 80 and 81. The mount table 60 has a stopper 61 for determining the insertion position of the optical card, a light shield plate 62 for detecting the position of the mount table 60, and a pin 63 fixed at one side portion of the mount table 60. In the vicinity of an end portion of the guide member 81, there are provided a photocoupler 64, a hook lever 65, and a solenoid 66. The photocoupler 64 functions to detect the state in which the light shield plate 62 has reached the detection position. The hook lever 65 has an engaging portion 65a to be engaged with the upper surface of the pin 63, and is situated substantially on a level with the pin 63. The solenoid 66 drives the lever 65. In the vicinity of the guide member 80, there are provided rollers 67 and 68; a drive motor 69; a pulley 70 attached to a rotational shaft of the drive motor 69; a belt 71 passed over the pulley 70 and rollers 67 and 68; a movable plate 72 movable in a vertical direction in respect of the surface of the optical card; a pressing roller 73 rotatably supported on the side face of the movable plate 72 and situated above the roller 67, and a pressing roller 74 situated above the roller 68; extension springs 75 and 76, connected to the movable plate 72, for urging the movable plate 72 downwards, thereby urging the pressing rollers 73 and 74 on the rollers 67 and 68 via the belt 71; and sensors 77 and 78, situated above the horizontal running portion of the belt 71, for detecting the state in which the card passes below. An optical card insertion unit 79 is provided on one side of the guide members 80 and 81. The insertion unit 79 has an opening which corresponds substantially to the card mounting portion 60a of the mount table 60. The lower surface of the opening of the unit 79 is substantially on a level with the horizontal running portion of the belt 71.

The operation of the above apparatus will now be described.

The mount table 60 is situated such that the light shield plate 62 provided on the mount table 60 is situated at the detection position of the photocoupler 64. The pin 63 of mount table 60 engages with the engaging portion 65a of lever 65, thereby fixing the mount table 60. In this state, an optical card is inserted into the opening of the card insertion unit 79. When the end portion of the inserted optical card has reached the detection position of the sensor 77 and has been detected by the sensor 77, the drive motor 69 is actuated by the command from a control unit (not shown), and the belt 71 passed over the pulley 70 and rollers 67 and 68 is run. As the horizontal running portion of the belt 71 runs, the pressing rollers 73 and 74 rotate. In this state, the optical card is further inserted, and when the end portion of the card has reached the gap between the roller 67 and the pressing roller 73, the card is clamped between the horizontal running portion of the belt 71 and the pressing roller 73. Then, the card is guided by a guiding means (not shown). The card advances further, and its end portion passes through the gap between the roller 68 and the pressing roller 74 and reaches the card mounting portion 60a of mount table 60 which is on a level with the card. By the driving force of the motor 69 and the pulling force of the extension springs 75 and 76, the optical card advances further and, at last, the end portion of the card abuts on the stopper 61. At the same time, the rear end portion of the card reaches the detection position of the sensor 78 and is detected. Once the rear end portion of the card is detected, the solenoid 66 is actuated and the lever 65 is rotated. Then, the engagement of the engaging portion 65a and the pin 63 of mount table 60 is released and simultaneously the servo motor (not shown) is driven to run a belt (not shown). Thus, the mount table 60 fixed to the belt is moved forwards along the guide members 80 and 81.

When the movement of the mount table 60 is started, the movable plate 72 is moved upwards and fixed by a drive mechanism (not shown) against the force of the springs 75 and 76, thereby releasing the clamped state of a part of the optical card by means of the rollers 67 and 68 and pressing rollers 73 and 74. After the mount table 30 has moved forwards for a relatively short distance, the mount table 60 moves reciprocally for a predetermined distance, thereby enabling the optical head to perform an information recording/reproducing operation.

After the recording/reproducing operation is completed, the mount table 60 is moved backwards and the photocoupler 64 detects the state in which the light shield plate 62 provided on the mount table 60 has reached the detection position of the photocoupler 64. Simultaneously, the pin 63 attached to the mount table 60 engages with the lever 65, thereby fixing the mount table 60 once again. Thereafter, the upper fixed state of the movable plate 72 is released, and the portion of the card on the roller 68 is clamped by the roller 74 between the roller 74 and the belt 71 by the force of the extension springs 75 and 76. As has been stated above, once the light shield plate 62 reaches the detection position of the photocoupler 64 and is detected by the photocoupler 64, the drive motor 69 is rotated by the command from the controller (not shown) in the direction opposite to the direction of the insertion of the card. Thus, the horizontal running portion of the belt 71 is run in the opposite direction. The optical card clamped between the roller 68 (belt 71) and the pressing roller 7 is pulled from the mounting portion of mount table 60 by the drive force of the motor 69. While the optical card is pressed on the belt 71 by the pressing rollers 73 and 74, the end portion of the card is finally ejected from the opening of the insertion unit 79. Thus, the optical card can be pulled out of the apparatus. When the sensor 77 has detected the completion of the passing of the card, the drive motor 69 is stopped by the command from the control unit (not shown).

In the optical card apparatus having the above structure, the detection of the completion of the loading of the card onto the mount table is effected by detecting the rear end portion of the inserted card. Thus, when optical cards have various longitudinal lengths or lengths less than the standard values are employed and inserted, the exact detection is not possible and the normal operation of the apparatus cannot be performed. There is a concern that a non-standard card (e.g. a narrow one, a long one, a perforated one, a partially cut one, etc.), which can be inserted into the insertion unit and can be detected by the sensor for sensing the insertion thereof and start the operation of the card-receiving mechanism, may be received by the apparatus, and the completion of the insertion may be determined to start the next operation.

SUMMARY OF THE INVENTION

The object of the present invention is to provide a highly reliable optical card scanning apparatus capable of automatically receiving an inserted optical card and positioning the card at a normal position on a mount table. In this apparatus, it can be determined whether the inserted card is a standard one. Where the inserted card is a non-standard one, the card is ejected. Then, the apparatus stands by for the insertion of the next card. Thus, the problems due to the insertion of a nonstandard card can be prevented. In addition, by monitoring the operation of moving the card to the mount table, it can be determined which part of a cardreceiving mechanism has malfunctioned.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An optical scanning apparatus according to an embodiment of the present invention will now be described with reference to FIGS. 2 to 13.

Figure 2:
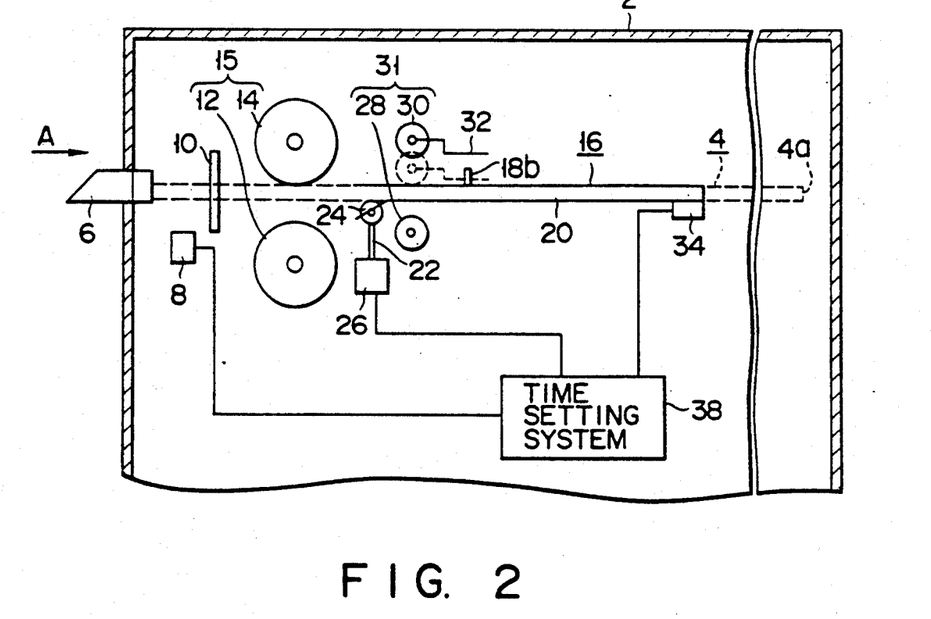
FIG. 2 is a side view showing an optical card scanning apparatus according to an embodiment of the present invention.

As is shown in FIG. 2, the optical card apparatus according to this embodiment comprises a housing 2. Within the housing 2, a card convey path 4 is defined, which has a first end situated on the front side of housing 2 and a second end 4a situated on the rear aide of housing 2. An optical card is conveyed through the path 4. The first end of the path 4 is defined by an insertion port 6 formed in the front wall of the housing 2. The card is guided into the path 4 through the insertion port 6.

Figure 3:
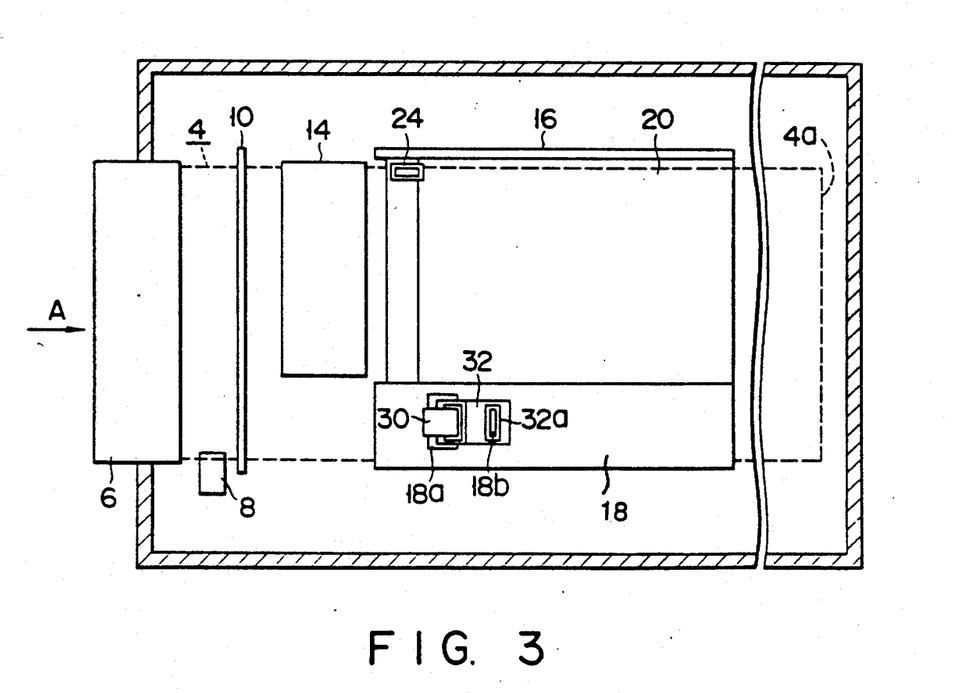
FIG. 3 is a top view of the apparatus shown in FIG. 2.

A first detector 8 for detecting the insertion and ejection of the optical card is disposed to the rear of the insertion port 6, i.e. on the first end side of the card convey path 4. As is shown in FIG. 3, the first detector 8 is situated on the right side (as viewed from the front face of the housing 2) of the card convey path 4 in its width direction. To the rear of the first detector 8, there is provided a vertically movable shutter 10 for blocking the card convey path 4 thereby to prevent the insertion/ejection of the card. A first drive roller 12 is disposed to the rear of the shutter 10 which rotates in both directions to selectively convey the optical card in the insertion direction (forward direction) indicated by A in FIGS. 2 and 3 and in the ejection direction (reverse direction). A cleaning roller 14, which clamps the optical card between itself and the first drive roller 12 and cleans the recording surface of the card, is situated just above the first drive roller 12. Like the first drive roller 12, the cleaning roller 14 rotates in both directions so as to convey the card in the insertion direction and the ejection direction. The first drive roller 12 and the cleaning roller 14 constitute a first convey mechanism 15.

A loading/unloading position is set in the card convey path 4 and slightly to the rear of the first convey mechanism. At the loading/unloading position, the optical card is loaded on a mount table 16 (described later) and is unloaded from the mount table 16. The mount table 16 is a support means for supporting the optical card and moving the card along the card convey path 4. The mount table 16 is movable along the path 4 between the loading/unloading position and the second end 2a of the path 4. In FIGS. 2 and 3, the mount table 16 is situated at the loading/unloading position.

The mount table 16 has a top plate 18 extending longitudinally on the right side of the table 16, and a bottom wall 20 serving as a support member for supporting the optical card on its upper surface. A roller 24, which is rotatably supported at an upper end portion of a plate member 22, is partially projected from a leftside area of the front end portion of the bottom wall 20. The distance between the roller 24 and the first detector 8 along a lateral line intersecting the longitudinal axis of the table 16 at right angles is slightly smaller than the width (the dimension along lateral line) of the optical card. The plate member 22 supporting the roller 24 is attached to the housing 2 so as to be movable in the vertical direction, and the plate member 22 is urged upwards by urging means (not shown).

A second detector 26 is disposed below the plate member 22. The second detector 26 detects the vertical movement of a lower end portion of the plate member, thereby detecting the loading/unloading of the optical card onto/from the mount table 16 and also the state in which the mount table 16 has reached the loading/unloading position. The second detector 26 is situated on the left side of the card convey path 4. The distance between the second detector 26 and the first detector 8 along a longitudinal line of the longitudinal axis of the table 16 is slightly shorter than the length of the card. In addition, since the distance between the first detector 8 and the roller 24 along a lateral line is slightly shorter than the width of the optical card, the distance between the first detector 8 and the second detector 26 along a lateral line is set similarly.

A second drive roller 28 is disposed to the rear of the roller 24. The second drive roller 28 rotates in both directions to convey the optical card in the loading direction and unloading direction. A pressing roller 30 is disposed above the second drive roller 28. The pressing roller 30 faces the second drive roller 28 through a window portion 18a formed in the top plate 18 of the mount table 16 (shown in FIG. 3), and the roller 30 clamps the optical card between itself and the second drive roller 28. The second drive roller 28 and the pressing roller 30 constitute a second convey mechanism 31. The first and second convey mechanisms 15 and 31 constitute convey means. The pressing roller 30 is rotatably attached at a distal end portion of a vertically movable support plate 32, so as to be contacted with-/detached from the mount table 16. A proximal end portion of the support plate 32 is provided with an opening 32a engaged with a projection 18b provided on the upper surface of the top plate 18. In this manner, when the support plate 32 approaches the mount table 16, the pressing roller 30 faces the second drive roller 28 and clamps the optical card between itself and the second drive roller 28, and the opening 32a is engaged with the projection 18b, thereby locking the mount table 16. The mount table 16 is locked at the above-mentioned loading/unloading position.

A third detector 34 is fixed on a lower surface of the mount table on the second end side (rear end side) of the table 16. The detector 34 senses one end of the optical card and detects the state in which the card has been completely loaded on the mount table 16. The distance between the third detector 34 and the second detector 26 along a longitudinal line is slightly greater than the length of the optical card.

Figure 4:
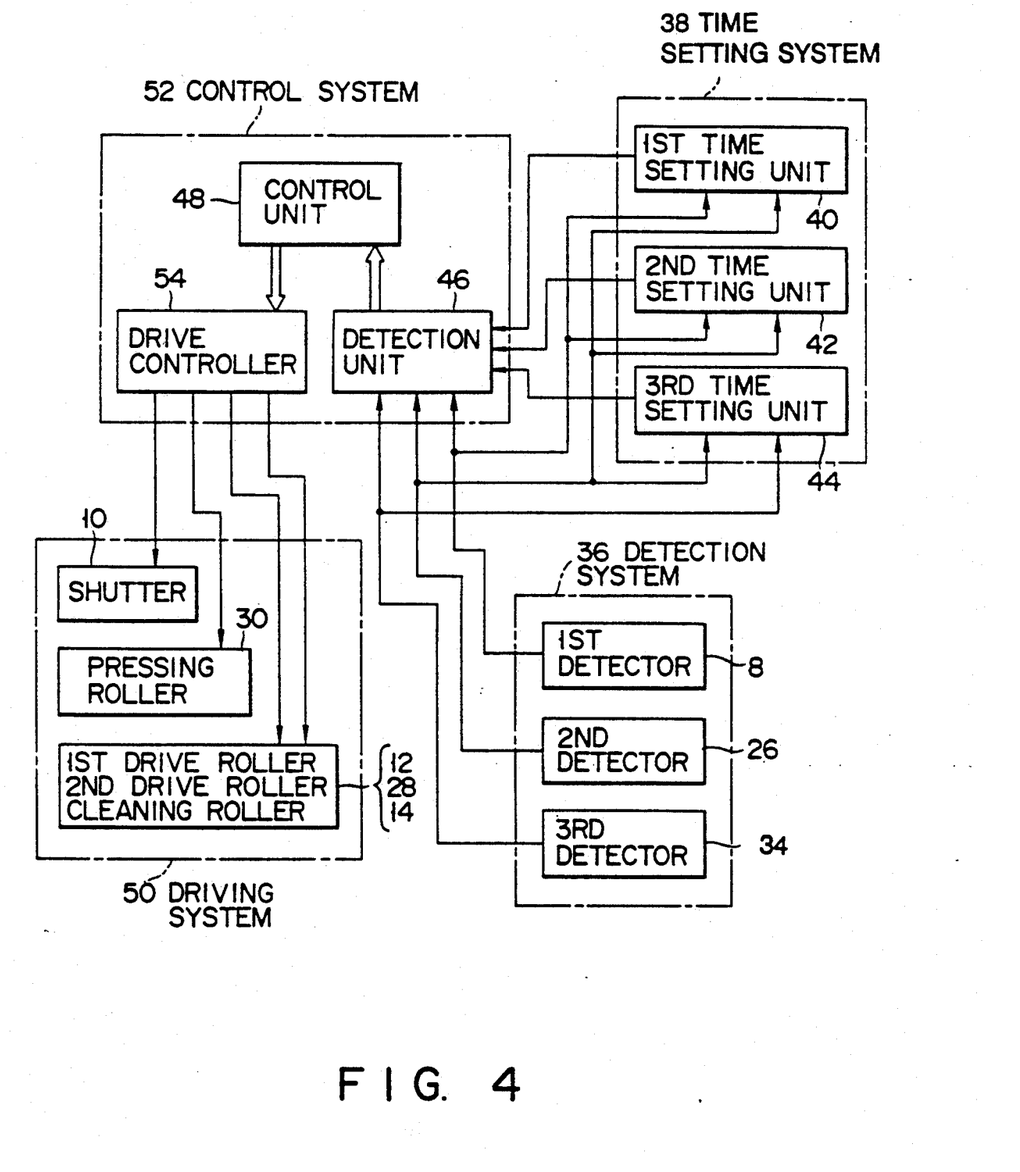
FIG. 4 is a block diagram showing the connections among a control system, time setting system, detecting system and driving system.
Figure 5A:
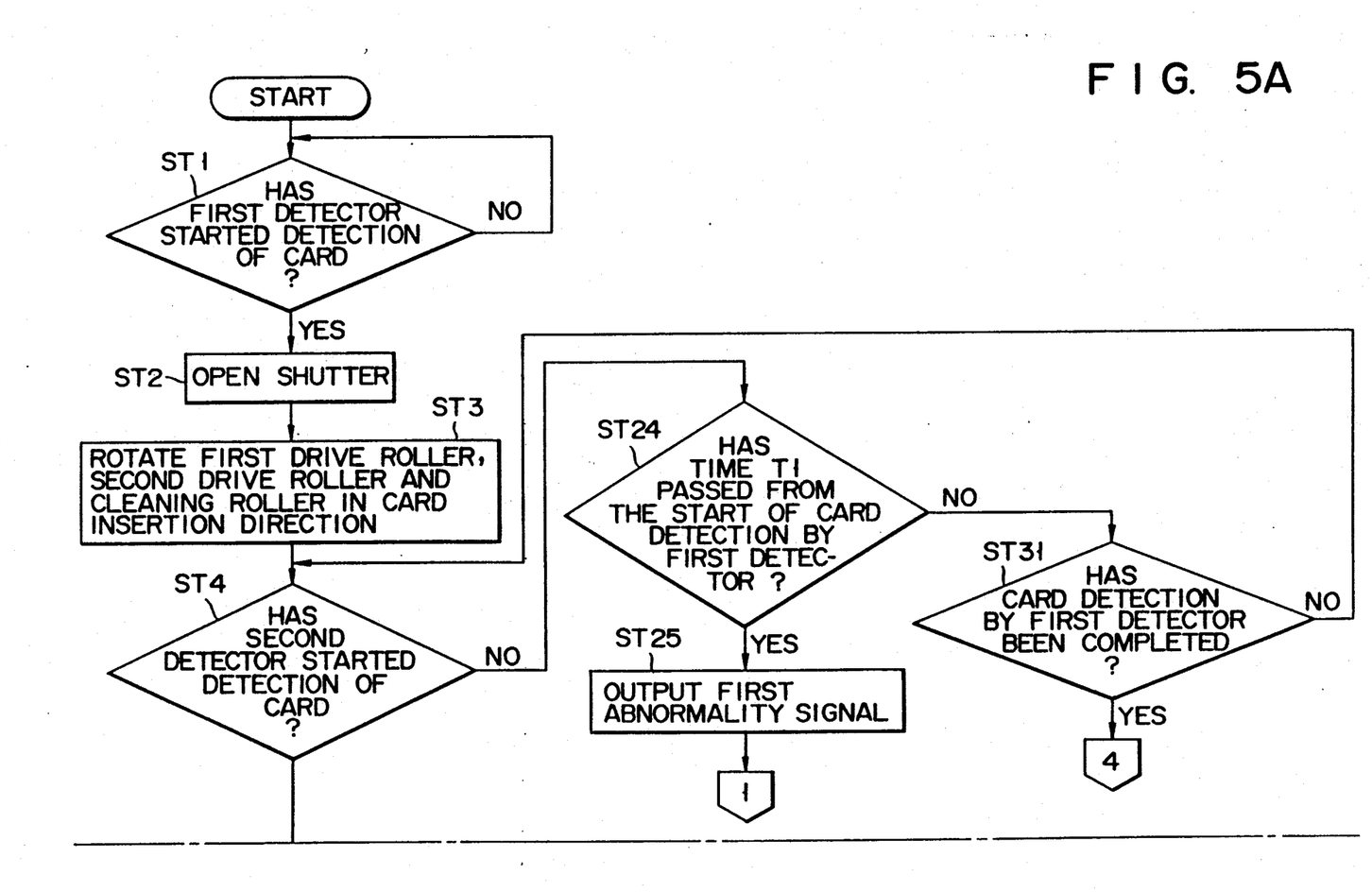
FIGS. 5A, 5B, 5C and 5D are flowcharts illustrating the operation of the control system at the time of inserting an optical system.
Figure 5B:
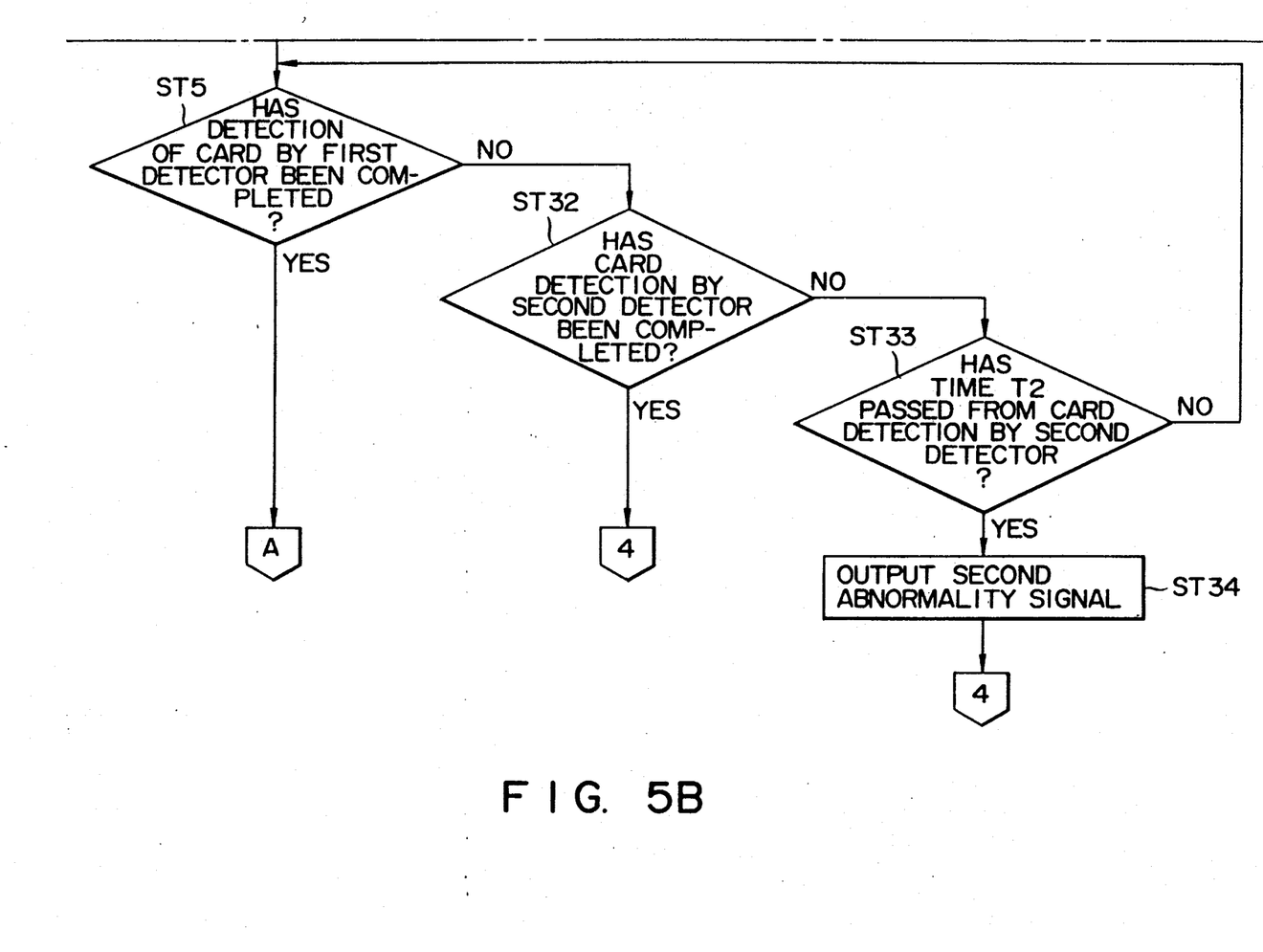
Figure 5C:
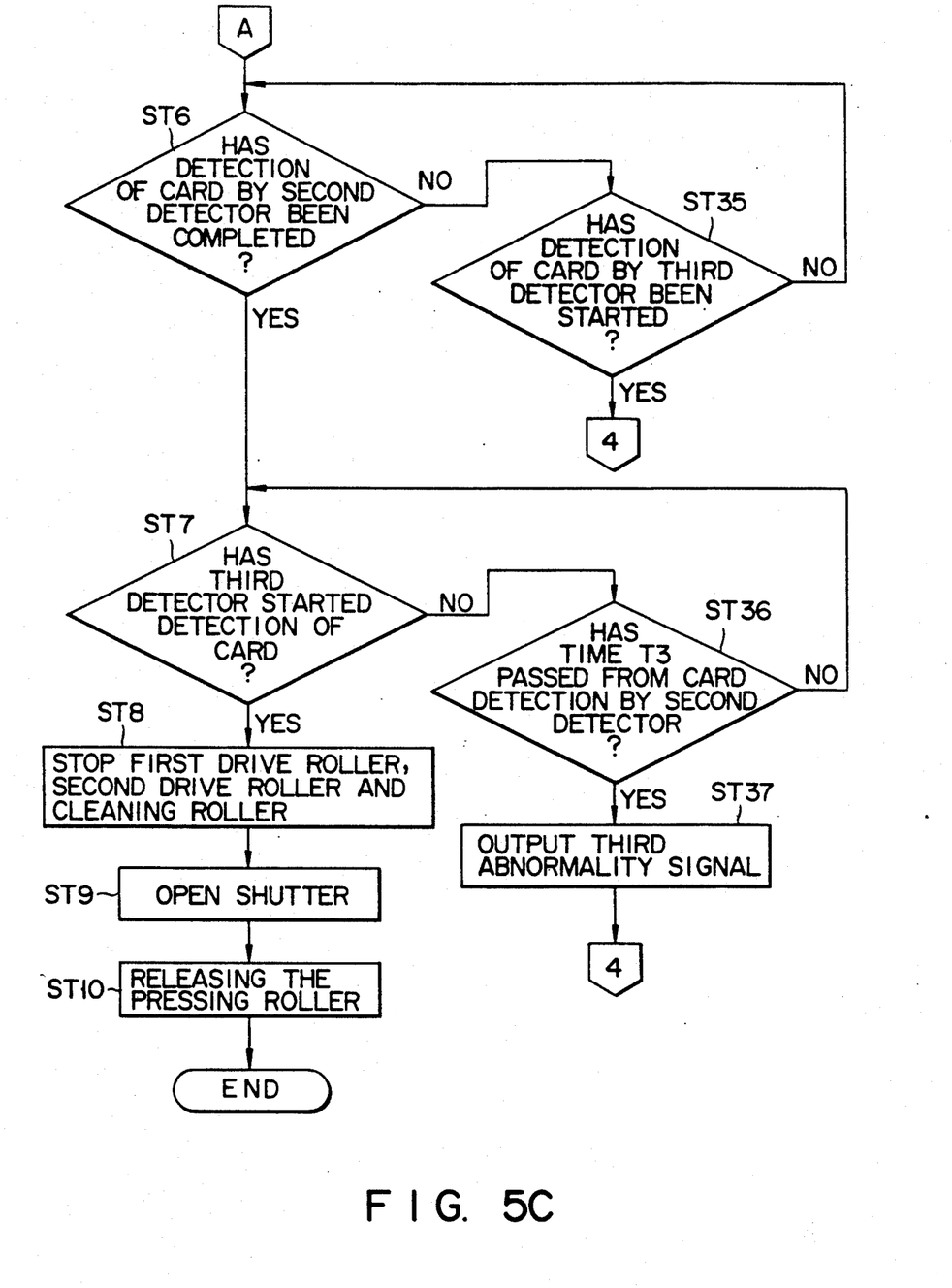
Figure 5D:
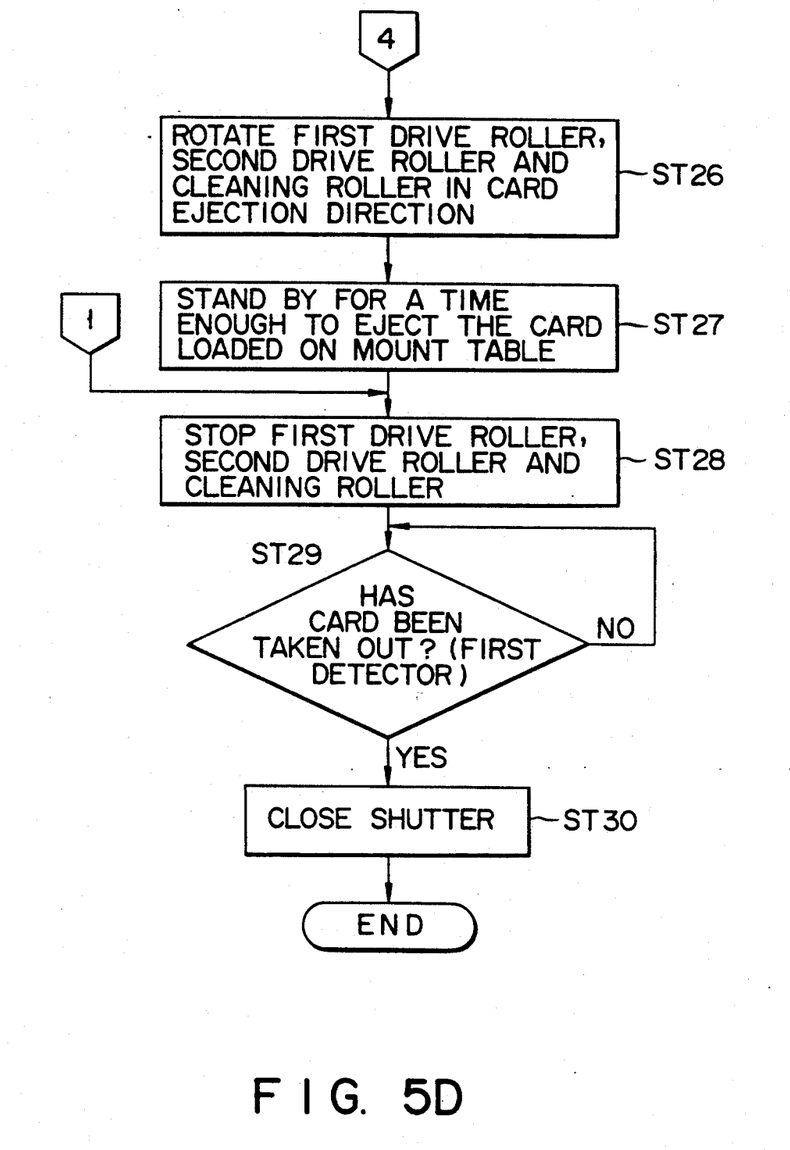

As is shown in FIG. 2, the three detectors 8, 26 and 34, which constitute a detection system 36, are connected to a time setting system 38. The time setting system 38 comprises a first time setting unit 40, a second time setting unit 42 and a third time setting unit 44, as shown in FIG. 4. Each of the first and second time setting units 40 and 42 is connected to the first and second detectors 8 and 26. The third time setting unit 44 is connected to the second and third detectors 26 and 34. The detection system 36 and time setting system 38 are connected to a detection unit 46, and deliver signals to a detection unit 46. The detector unit 46 is connected to a control unit 48 for performing the general control of the card scanning apparatus. The control unit 48 is connected via a drive controller 54 to a driving system 50 having a shutter 10, a pressing roller 30, a first drive roller 12, a second drive roller 28 and a cleaning roller 14. The detection unit 46, control unit 48 and drive controller 54 constitute a control system 52.

In the first time setting unit 40, a time T1 is set. The time T1 is slightly longer than a standard time t1 from when the detection of the optical card by the first detector 8 is started to when the detection of the card by the second detector 26 is started. In the second time setting unit 42, a time T2 is set. The time T2 is slightly longer than a standard time t2 from when the detection of the card by the second detector 26 is started to when the detection of the card by the first detector 8 is completed. In the third time setting unit 44, a time T3 is set. The time T3 is slightly longer than a standard time t3 from when the detection of the card by the second detector 26 is started to when the detection of the card by the third detector 34 is completed.

Each of the first to third time setting units 40 42 and 44 receives signals from the two detectors connected thereto, and compares a time interval of these signals with the time set in each setting unit. Specifically, the first time setting unit 40 compares the set time T1 with the actual time from when the detection by the first detector 8 is started to when the detection by the second detector 26 is started, and when the actual time is longer than the set time T1, a first abnormality signal is sent to the detection unit 46. The second time setting unit 42 compares the set time T2 with the actual time from when the detection by the second detector 26 is started to when the detection by the first detector 8 is completed, and when the actual time is longer than the set time T2, a second abnormality signal is sent to the detection unit 46. The third time setting unit 44 compares the set time T3 with the actual time from when the detection by the second detector 26 is started to when the detection by the third detector 34 is started, and when the actual time is longer than the set time T3, a third abnormality signal is sent to the detection unit 46.

The detection unit 46 connected to the detection system 36 and time setting system 38 receives a signal from the detection system 36 and an abnormality signal from the time setting system 38, and sends the signals to the control unit 48 for genera control. The control unit 48 therefore receives the signal from the detection system 36 and the abnormality signal from the time setting system 38. When the control unit 48 does not receive the abnormality signal, it delivers to the driving system 50 via the drive controller 54 a control signal for the normal operation according to the detection system 36, and when the control unit 48 receives the abnormality signal, it delivers a control signal according to the abnormality signal from the time setting system 38. More specifically, the drive controller 54 supplies the shutter 10 with an opening/closing signal for opening/closing the shutter 10, and supplies the pressing roller 30 with a contacting/separating signal for contacting/separating the pressing roller 30 with/from the mount table 16.

When the optical card is inserted, the control unit 48 in the control system 52 actuates the first and second drive rollers 12 and 28 and the cleaning roller 14 and opens the shutter 10, on the basis of the signal from the first detector 8, and the control unit 48 also stops the first and second drive rollers 12 and 28 and the cleaning roller 14, closes the shutter 10 and approaches the pressing roller 30 to the mount table 16, on the basis of the signal from the third detector 34. On the other hand, when the card is ejected, the control unit 48 in the control system 52 closes the shutter 10, on the basis of the signal from the first detector 8, and the unit 48 actuates/stops the first and second drive rollers 12 and 28 and the cleaning roller 14, opens/closes the shutter 10 and separates the pressing roller 30, on the basis of the signal from the second detector 26.

The operation of the optical card scanning apparatus having the above structure, in the case where a normal optical card is scanned, will now be described. In the following description, one end portion of the optical card, from which the card is inserted, is referred to as "insertion end portion", and the other end portion, from which the card is ejected, is referred to as "ejection end portion". (When the detectors perform detecting operations, detection signals are sent to the control unit 48 through the detection unit 46, and the control unit 48 delivers control signals determined according to the situation to the driving system 50 through the drive controller 54 to actuate the driving system 50; the flow of signals in this case, however, will not be described for the purpose of brevity, except when it deserves special mention.)

FIGS. 5A, 5B, 5C and 5D are flowcharts illustrating the operation of the control system at the time of inserting an optical card.

In the state in which the optical card is not loaded in the optical card scanning apparatus ("initial state"), the pressing roller 30 is close to the mount table 16, as shown in FIG. 2 by a broken line. The mount table 16 is fixed by engagement of the projection 18b and the support plate 32. The first and second drive rollers 12 and 28 and the cleaning roller 14 are stopped, and the shutter 10 is closed. The normal optical card is inserted from the insertion port 6, and the insertion end portion of the card reaches the first detector 8. At this time, the first detector 8 starts the detection of the card ("YES" in step ST1 in FIG. 5A), and a signal is sent from the control system 52 to the driving system 50, thereby opening the shutter (step ST2) and rotating the first and second drive rollers 12 and 28 and the cleaning roller 14 (step ST3). The card is further advanced in the direction A and the insertion end portion of the card is clamped between the first drive roller 12 and the cleaning roller 14. When the insertion end portion of the optical card reaches the second detector 26, the card pushes down the roller 24 and the plate member 22, and the lower end of the plate member 22 is detected by the second detector 26, thereby the second detector 26 starts the detection of the card ("YES" in step ST4). The card is further advanced in the direction A and the insertion end portion of the card is clamped between the drive roller 28 and the pressing roller 30. Then, the ejection end portion (opposite to the insertion end portion) of the card passes by the first detector 8, and the detection of the card by the first detector 8 has been completed ("YES" in step ST5 in FIG. 5B). The card is advanced in the direction A while being clamped between the first drive roller 12 and cleaning roller 14 of the first convey mechanism 15 and between the second drive roller 28 and the pressing roller 30 of the second convey mechanism 31. When the ejection end portion of the card has passed the first convey mechanism 15 and the roller 24, the plate member 22 returns to the original position, and the detection of the card by the second detector 26 has been completed ("YES" in step ST6 in FIG. 5C). The card is conveyed while being clamped by the second convey mechanism 31. The insertion end portion of the card reaches the third detector 34, and the detection of the card by the third detector 34 starts ("YES" in step ST7). The detection signal of the third detector 34 is sent to the driving system 50 through the control system 52. Then, stopping the first and second drive rollers 12 and 28 and the cleaning roller 14 (step ST8), closing the shutter (step ST9) and raising and releasing the pressing roller 30 (step ST10).

Once the pressing roller 30 is raised to release the fixation of the mount table 16, the mount table 16 moves towards the second end 4a of the card convey path 4 shown in FIG. 2. The optical card is scanned while being moved between the loading/unloading position and the second end 4a.

Figure 6A:
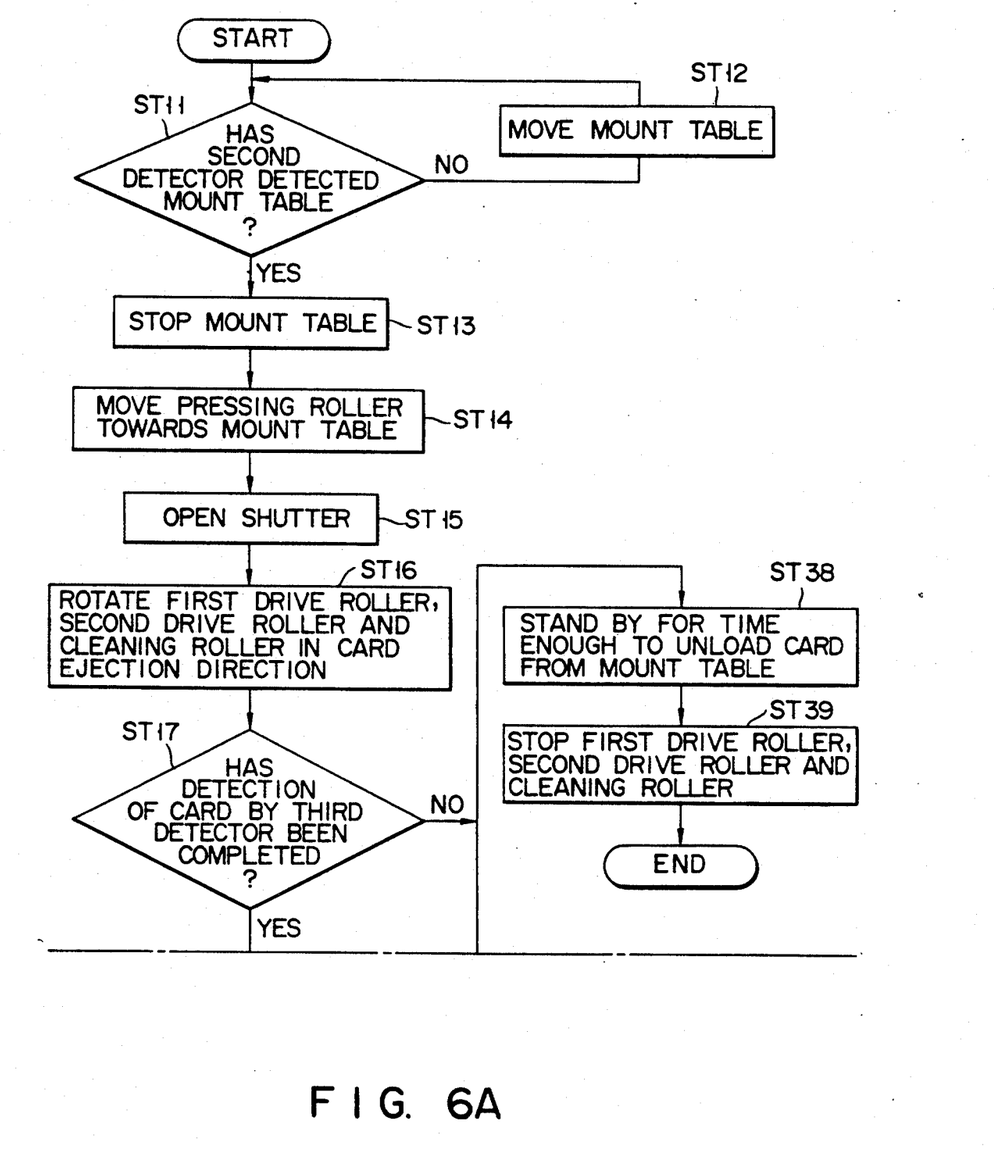
FIGS. 6A and 6B are flowcharts illustrating the operation of the control system at the time of ejecting the optical card
Figure 6B:
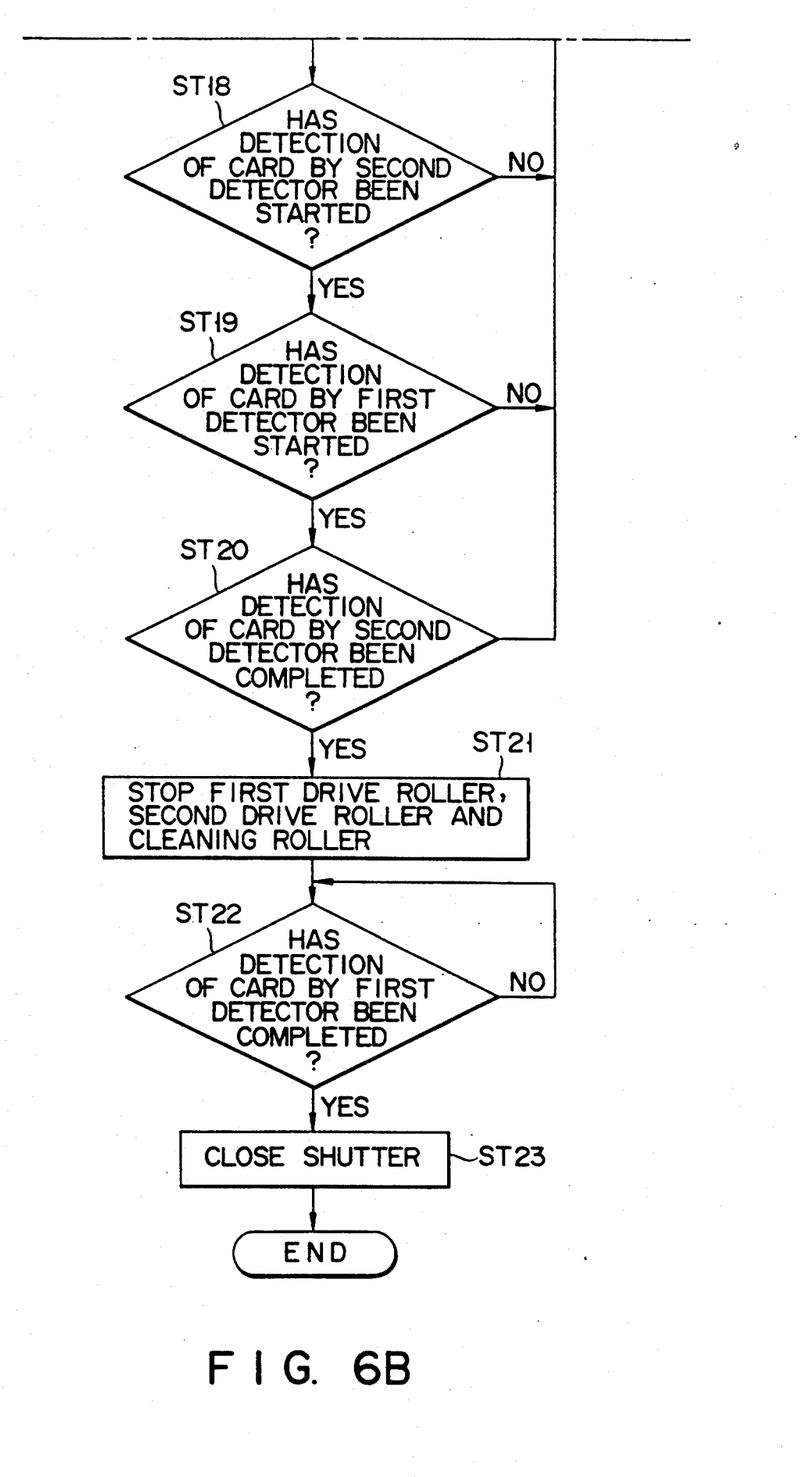

FIGS. 6A and 6B are flowcharts illustrating the operation of the control system at the time of ejecting the optical card. After the scan of the card is finished, the mount table 16 is moved from the second end 4a of the card convey path 4 to the loading/unloading position at the second detector 26 (step ST12 in FIG. 6A). If the mount table is detected by the second detector 26 ("YES" in step ST11), the mount table 16 is stopped by a signal from the control system 52 (step ST13). Then, the pressing roller 30 is moved towards the mount table 16 (step ST14), the mount table 16 is fixed, and the card is clamped between the second drive roller 28 and the pressing roller 30. Further, the shutter 10 is opened (step ST15) and the first drive roller 12, second drive roller 28 and the cleaning roller 14 are rotated in a direction opposite to the direction A (in FIGS. 2 and 3), that is, in such a direction as to move the optical card in the ejection direction (step ST16). The card is conveyed in the ejection direction by the second drive roller 28 and the pressing roller 30, and the detection of the card by the third detector 34 has been completed ("YES" in step ST17). Then, the ejection end portion of the optical card reaches the second detector 26, and the detection of the card by the second detector 26 starts ("YES" in step ST18 in FIG. 6B). The card is further moved by the second convey mechanism 31 in the ejection direction, the ejection end portion of the card is clamped between the rollers 12 and 14 of the first convey mechanism 15. And the card is further moved. When the ejection end portion of the card reaches the first detector 8, the detection of the card by the first detector 8 starts ("YES" in step ST19). And then, the insertion end portion of the card leaves the second convey mechanism 31, the card is conveyed by the first convey mechanism 15 in the ejection direction until the insertion end portion thereof passes by the second detector 26. Once the insertion end portion of the card passes by the second detector 26, the detection of the card by the second detector 26 has been completed ("YES" in step ST20), and the first drive roller 12, second drive roller 28 and the cleaning roller 14 are stopped (step ST21). Then, the insertion end portion of the optical card projects from the insertion port 6 outside the housing 2, thus allowing the user to take out the card. After the user takes out the card, the detection of the optical card by the first detector 8 is completed ("YES" in step ST22), the shutter 10 is closed in response to the signal from the control system 52 (step ST23). When the card is ejected from the housing 2 and the shutter is closed in this manner, the operation of the optical card scanning apparatus ends and the apparatus stands by for the insertion of the next card.

Figure 7:
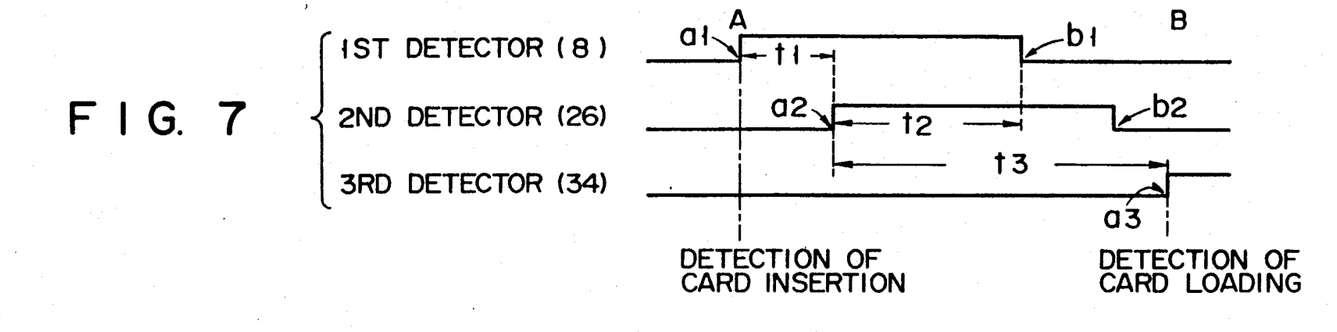
FIG. 7 is a timing chart showing the outputs from the detection system when a standard optical card is inserted and the apparatus of the present invention operates normally.

FIG. 7 is a timing chart showing the outputs from the detection system 36 when the apparatus of the present invention operates normally (i.e. from the start of detection of the card by first detector 8 (step ST1 in FIG. 5A) to the start of detection of the card by third detector 34 (step ST7 in FIG. 5C)).

In FIG. 7, t1, t2 and t3 indicate standard time periods of output signals from the two detectors, as described in connection with the time setting system 38. At time point A, the card insertion into the housing 2 is detected. At time point B, the card loading on the mount table 16 is detected. At time points a1, a2 and a3, the card detection by the respective detectors is started. At time points b1 and b2, the detection is completed.

FIGS. 8 to 13 are timing charts showing the outputs from the detection system 36 when the apparatus of this invention does not operate normally at the detection time points a1 (step ST1), a2 (step ST4), a3 (step ST7), b1 (step ST5) and b2 (step ST6).

At first, if the detection of the card by the first detector 8 is not started ("NO" in step ST1), the control stands by until the first detector 8 starts to detect the optical card.

Figures 8, 9:
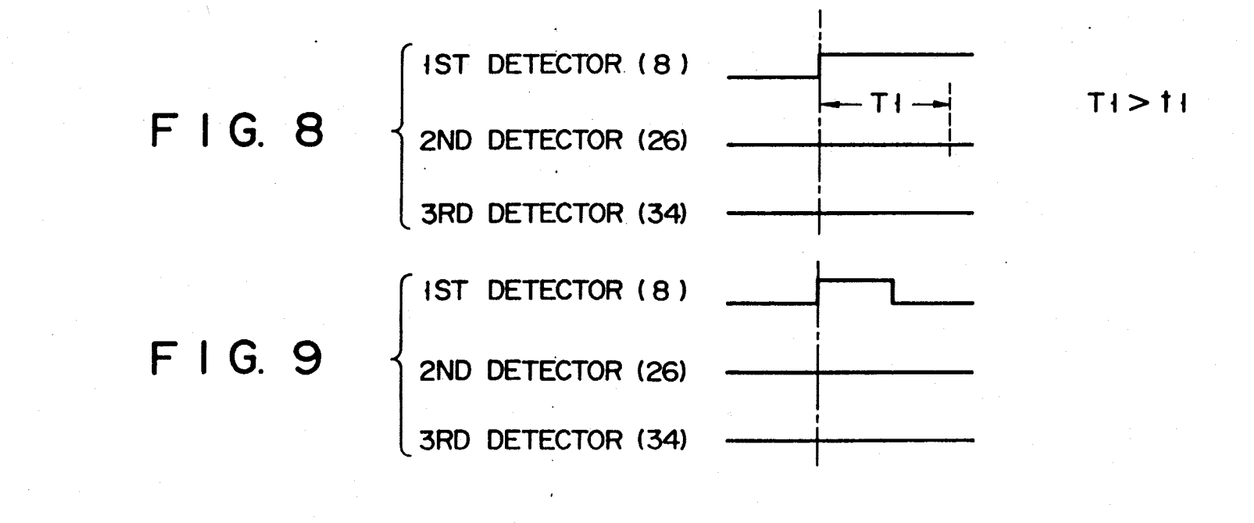
FIGS. 8 to 13 are timing charts showing the outputs from the detection system when a non-standard optical card is inserted or the apparatus of this invention does not operate normally.

If the card detection by the second detector 26 is not started ("NO" in step ST4) and time T1 has passed from the start of card detection by the first detector 8 ("YES" in step ST24), the first time setting unit 40 delivers a first abnormality signal to the control unit 48 through the detection unit 46 (step ST25). Then, the control unit 48 restores the apparatus to the initial state. Specifically, the drive controller 54 of the control unit 48 stops the first and second drive rollers 12 and 28 and the cleaning roller 14 (step ST28 in FIG. 5D), and the control stands by until the card detection by the first detector 8 is completed and the the card is taken out ("YES" in step ST29), and then, the shutter is closed (step ST30) and the operation of the apparatus is completed. This situation may result from a malfunction of shutter 10, a malfunction of first convey mechanism 15 comprising first drive roller 12 and cleaning roller 14, jamming of the card at the insertion port 6, shutter 10, first drive roller 12 or cleaning roller 14, taking-out of the card, etc. Referring to FIG. 9, if the card detection by the first detector 8 is completed ("YES" in step ST31 in FIG. 5A) when the card detection by the second detector 26 is not started ("NO" in step ST4;, the apparatus is restored in the initial state after the control unit 48 once executes the card ejection operation, that is, after the first and second drive rollers 12 and 28 and cleaning roller 14 are rotated in the ejection direction (step ST26 in FIG. 5D) and the control stands by for a time necessary for unloading the card from the mount table 16 (step ST27). This situation results from the insertion of a card with a small width and the taking-out of the card. The second drive roller 28 and pressing roller 30 are provided on the first detector (8) side, that is, the right side of the apparatus; thus, the card can be surely ejected even if the card with a small width is inserted past the first convey mechanism 15.

Figure 10:
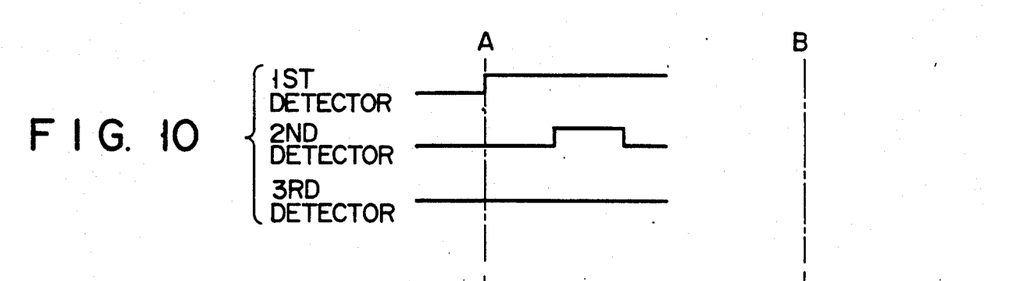

Referring to FIG. 10, if the card detection by the second detector 26 is completed ("YES" in step ST32 in FIG. 5B) when the card detection by the first detector 8 is not completed ("NO" in step ST5), the control unit 48 executes the card ejection operation and then restores the apparatus in the initial state. This situation may result from insertion of a card with a notch or hole formed on the left side of the apparatus.

Figure 11:
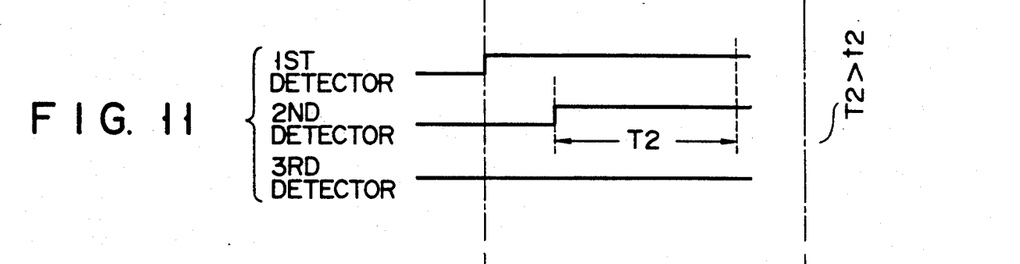

Referring to FIG. 11 if the card detection by the first detector 8 is not completed ("YES" in step ST33) even after time T2 has passed since the card was detected by the second detector 26, the second time setting unit 42 delivers a second abnormality signal to the control unit 48 (step ST34), and the control unit 48 once executes the ejection operation in response to this abnormality signal and then restores the apparatus to the initial state. This situation may result from jamming of the card at the insertion port or insertion of a long card.

Figures 12, 13:
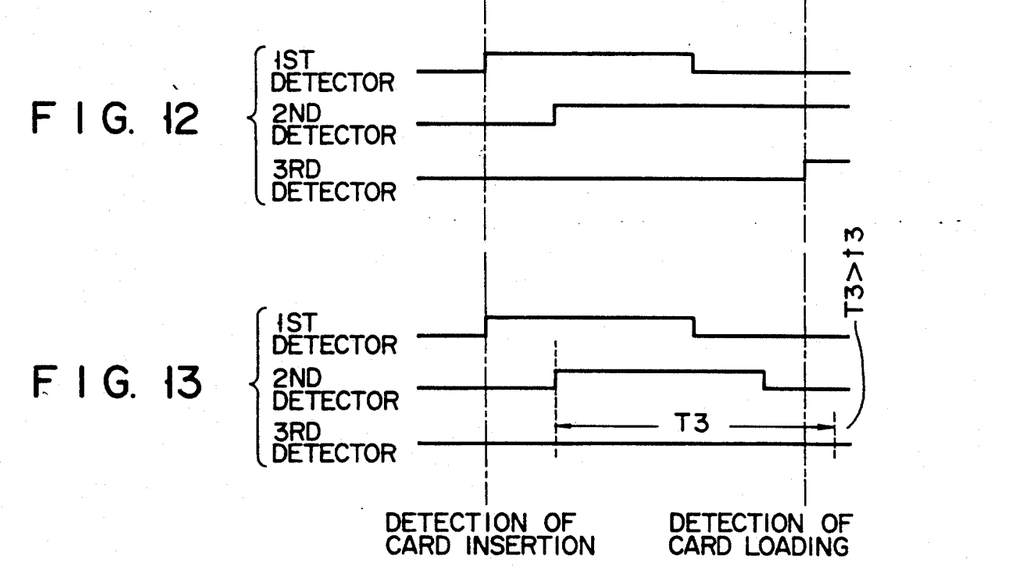

Referring to FIG. 12, if the card detection by the third detector 34 is started ("YES" in step ST35 in FIG. 5C) when the card detection by the second detector 26 has not been completed ("NO" in step 6), the control unit 48 once executes the ejection operation and then restores the apparatus to the initial state. This situation may result from insertion of a long card.

Referring to FIG. 13, if the card detection by the third detector 34 is not started ("YES" in step ST36) after time T3 has passed since the card was detected by the second detector 26, the third time setting unit 44 outputs a third abnormality signal to the control unit 48 (step ST37). When the control unit 48 receives this signal, it once executes the card ejection operation and then restores the apparatus to the initial state. This situation may result from a malfunction of the second convey mechanism 31 or insertion of a short card.

In the card ejection mode, if each detector does not perform a detection operation ("NO" in step ST17; "NO" in step ST18; "NO" in step ST19; "NO" in step ST20) after the first and second drive rollers 12 and 28 and cleaning roller 14 were rotated to convey the card in the ejection direction, the control stands by for a time enough to unload the card from the mount table 16 (step ST38) and then stops the first and second drive rollers 12 and 28 and cleaning roller 14 (step ST39). Thus, the operation of the apparatus ends.

The present invention is not limited to the above embodiment, and various changes and modifications may be made without departing the subject matter of the invention.

The first to third detectors 8, 26 and 34 used in the above embodiment may be contact-type switches using mechanical means, non-contact-type sensors using optical means, etc. The construction of the first to third time setting units 40, 42 and 44 may be changed, if they are capable of outputting operation abnormality signals in accordance with the result of comparison between the standard times and the time differences between the output signals from the first to third detectors 8, 26 and 34.

According to the present invention, the optical card inserted into the optical card scanning apparatus can automatically be positioned at the normal position on the mount table. In addition, in this process, it can be determined whether the inserted card has been taken out or the inserted card is a standard one. Where the inserted card is a non-standard one, the insertion of the card is stopped and the card is ejected. Then, the apparatus stands by for the insertion of the next card. Thus, the problems due to the taking-out of the card or the insertion of a non-standard card can be prevented. In addition, the reliability of the optical card apparatus can be enhanced. By monitoring the operation of moving the card to the mount table, it can be determined which part of the card-receiving mechanism has malfunctioned. Therefore, the part of malfunction can be quickly detected and repaired, and the maintenance of the apparatus can be improved.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical card scanning apparatus comprising:
   a housing having an insertion port;
   a card convey path provided within the housing and having a first-end side defined by the insertion port and a second-end side, and wherein an optical card loading/unloading position is set in the vicinity of said first-end side, and an optical card is conveyed along the card convey path from said first-end side toward said second-end side;
   support means having a first end on the first-end side of the card convey path, a second end on the second-end side of the convey path, and a support member for supporting the optical card between the first and second ends of the support means, said support means being movable while supporting the optical card between the loading/unloading position of the card convey path and the second-end side of the convey path;
   convey means for conveying the optical card, selectively in a forward direction from the insertion port towards the support member of the support means and in a reverse direction from the support member of the support means towards the insertion port;
   a detection system having a plurality of detection means arranged along the card convey path, each of said detection means detecting the presence of the optical card along the convey path at the respective position of the detection means, and generating an output signal while the presence of the card is being detected;
   a time setting system having time setting means for comparing time differences between the output signals from two detection means with a standard time, and, when the compared values are different, outputting operation abnormality detection signals; and
   control means for controlling the convey means, on the basis of the operation abnormality detection signal, so as to convey the optical card in the reverse direction and eject the card from the insertion port.

2. The optical card scanning apparatus according to claim 1, further comprising a shutter provided between the insertion port and the card loading/unloading position, the shutter being movable between a closed position in which the card convey path is closed and an opened position in which the convey path is opened to allow the passage of the card,
   said control means controlling the opening/closing of the shutter on the basis of the operation abnormality detection signals.

3. The optical card scanning apparatus according to claim 1, wherein said detection system comprises:
   first detection means, provided between the first-end side of the convey path and the card loading/unloading position, for detecting the presence of the optical card on the convey path at the position of the first detection means;
   second detection means, provided at the card loading/unloading position, for detecting the presence of the card on the convey path at the position of the second detection means, and outputting a detection signal while the presence of the card is being detected; and
   third detection means, provided at the second end of the support means, for detecting the presence of the card on the convey path at the position of the third detection means, and outputting a detection signal while the presence of the card is being detected.

4. The optical card scanning apparatus according to claim 3, wherein said time setting system comprises:
   time setting means for comparing a time difference between the detection signal from the first detection means and the detection signal from the second detection means with a standard first time; and
   another time setting means for comparing a time difference between the detection signal from the second detection means and the detection signal from the third detection means with a standard time different from the standard time of the first time setting means.

5. The optical card scanning apparatus according to claim 3, wherein said time setting system comprises:
   first time setting means for comparing a time from the output start of the first detection means to the output start of the second detection means with a first standard time, and, when the compared values are different, outputting a first operation abnormality detection signal;
   second time setting means for comparing a time from the output start of the second detection means to the output end of the first detection means with a second standard time, and, when the compared values are different, outputting a second operation abnormality detection signal; and
   third time setting means for comparing a time from the output start of the second detection means to the output start of the third detection means with a third standard time, and, when the compared values are different, outputting a third operation abnormality detection signal.

6. The optical card scanning apparatus according to claim 3, wherein:
   said card convey path has a first-edge side and a second-edge side, as viewed from said insertion port of said housing;
   said first detection means is provided on the first-edge side of said card convey path; and said second detection means is provided on the second-edge side of said card convey path.

7. The optical card scanning apparatus according to claim 1, wherein the convey means comprises:
- a first convey mechanism provided between the first-end side of the card convey path and the card loading/unloading position; and
- a second convey mechanism provided for moving the card along the supporting member.

8. An optical card scanning apparatus in which a card inserted from an insertion port is sandwiched between a driving roller and driven roller, and selectively conveyed in an insertion direction and an ejection direction opposite to the insertion direction, said optical card scanning apparatus comprising:
- first card-detecting means, located between the insertion port and the driving roller, for detecting the presence of a card;
- second card-detecting means, on an opposite side of the driving roller from the first card-detecting means, for detecting the presence of a card;
- third card-detecting means for detecting the presence of a card, said third card-detecting means being located downstream of the second card-detecting means with respect to the insertion direction and arranged such that the distance between the first and third card-detecting means is longer than the length of a card; and
- control means for executing:
    - a first error detecting operation if the second card-detecting means outputs a signal indicative of card detection between a time when the first card-detecting means outputs a signal indicative of card detection and a time when the first card-detecting means outputs a signal indicative of noncard detection, and if the third card-detecting means does not output a signal indicative of card detection within a predetermined time interval from the time when the first carddetecting means outputs the signal indicative of non-card detection, and
    - a second error detecting operation if the second card-detecting means outputs a signal indicative of non-card detection between the time when the first card-detecting means outputs the signal indicative of card detection and the time when the first card-detecting means outputs the signal indicative of non-card detection.

* * * * *